United States Patent
Niu et al.

(10) Patent No.: US 10,488,702 B2
(45) Date of Patent: Nov. 26, 2019

(54) DISPLAY DEVICE HAVING DIFFRACTION GRATING STRUCTURE AND DRIVING METHOD FOR THE SAME

(71) Applicants: BOE Technology Group Co., Ltd., Beijing (CN); Beijing BOE Optoelectronics Technology Co., Ltd., Beijing (CN)

(72) Inventors: Xiaochen Niu, Beijing (CN); Xue Dong, Beijing (CN); Xiaochuan Chen, Beijing (CN); Wenqing Zhao, Beijing (CN); Jian Gao, Beijing (CN); Pengcheng Lu, Beijing (CN); Ming Yang, Beijing (CN); Qian Wang, Beijing (CN); Rui Xu, Beijing (CN); Lei Wang, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 72 days.

(21) Appl. No.: 15/516,800

(22) PCT Filed: Aug. 25, 2016

(86) PCT No.: PCT/CN2016/096729
§ 371 (c)(1),
(2) Date: Apr. 4, 2017

(87) PCT Pub. No.: WO2017/118048
PCT Pub. Date: Jul. 13, 2017

(65) Prior Publication Data
US 2018/0267359 A1    Sep. 20, 2018

(30) Foreign Application Priority Data
Jan. 8, 2016    (CN) .......................... 2016 1 0012370

(51) Int. Cl.
*G06T 15/00* (2011.01)
*G02F 1/1335* (2006.01)
(Continued)

(52) U.S. Cl.
CPC ..... *G02F 1/133602* (2013.01); *G02B 6/0056* (2013.01); *G02B 27/0944* (2013.01);
(Continued)

(58) Field of Classification Search
None
See application file for complete search history.

(56) References Cited

U.S. PATENT DOCUMENTS 9,104,032 B1 * 8/2015 Chen .................. G02B 27/2214
9,612,381 B2 * 4/2017 Kurata .................. G02B 6/002
(Continued)

FOREIGN PATENT DOCUMENTS

CN    101339310 A    1/2009
CN    203630766 U    6/2014
(Continued)

OTHER PUBLICATIONS

Nov. 15, 2016—(WO) International Search Report and Written Opinion Appn PCT/CN2016/096729 with English Tran.

*Primary Examiner* — Anh-Tuan V Nguyen
(74) *Attorney, Agent, or Firm* — Banner & Witcoff, Ltd.

(57) ABSTRACT

A display device and a driving method for the same are disclosed. The display device includes a LCD panel and a backlight module disposed at a light incident side of the LCD panel; a surface of the backlight module facing the LCD panel is provided with a diffraction grating structure. Under 3D display mode, the light emitted by the backlight module is incident onto the LCD panel through the diffraction grating structure and formed into alternately bright and dark stripe patterns which are arranged laterally and extend-
(Continued)

ing lengthways, wherein every at least three bright stripe patterns arranged in sequence are considered as a group, and the bright stripe patterns in each group have colors different from each other. The display device not only reduces the entire thickness, but also improves the transmittance and reduces the power consumption, accordingly.

14 Claims, 3 Drawing Sheets

(51) Int. Cl.

| | | |
|---|---|---|
| *G02B 27/22* | (2018.01) | |
| *H04N 13/302* | (2018.01) | |
| *F21V 8/00* | (2006.01) | |
| *G02B 27/09* | (2006.01) | |
| *G02F 1/1362* | (2006.01) | |
| *H04N 13/32* | (2018.01) | |
| *H04N 13/324* | (2018.01) | |

(52) U.S. Cl.
CPC ......... *G02B 27/22* (2013.01); *G02B 27/2214* (2013.01); *G02F 1/133606* (2013.01); *G02F 1/136286* (2013.01); *H04N 13/302* (2018.05); *H04N 13/32* (2018.05); *H04N 13/324* (2018.05); *G02B 6/0028* (2013.01); *G02B 6/0068* (2013.01); *G02F 2201/305* (2013.01)

(56) References Cited

U.S. PATENT DOCUMENTS

| | | | |
|---|---|---|---|
| 2002/0001107 A1 | 1/2002 | Ichikawa et al. | |
| 2008/0084709 A1* | 4/2008 | Li ..................... | G02B 6/0016 362/616 |
| 2008/0259420 A1* | 10/2008 | Hossfeld ............... | G11B 7/128 359/11 |
| 2010/0091205 A1* | 4/2010 | Wu ..................... | G02B 27/2214 349/15 |
| 2012/0099215 A1* | 4/2012 | Wu ..................... | G02F 1/133514 359/891 |
| 2012/0105767 A1* | 5/2012 | Choi ..................... | G02B 6/0038 349/62 |
| 2012/0293735 A1* | 11/2012 | Jung ..................... | G02B 27/2214 349/15 |
| 2013/0076895 A1* | 3/2013 | Aoki ..................... | G01B 11/0608 348/136 |
| 2013/0201427 A1* | 8/2013 | Chen ..................... | G02B 27/2214 349/65 |
| 2014/0063385 A1* | 3/2014 | Yang ..................... | G06F 3/044 349/15 |
| 2014/0146271 A1* | 5/2014 | Hung ..................... | G02B 6/0011 349/62 |
| 2014/0176698 A1* | 6/2014 | Banerjee ............... | G01N 21/21 348/92 |
| 2014/0375707 A1* | 12/2014 | Wu ..................... | G02B 27/2228 345/697 |
| 2015/0015568 A1* | 1/2015 | Fang ................... | H04N 13/0409 345/419 |
| 2015/0036068 A1* | 2/2015 | Fattal ................. | G02B 27/2214 349/15 |
| 2015/0124316 A1* | 5/2015 | Kim ................... | G02B 27/2214 359/463 |
| 2016/0139326 A1* | 5/2016 | Choi ................... | G02B 6/0076 362/607 |
| 2016/0170128 A1* | 6/2016 | Groothues ........... | G02B 6/0043 362/624 |
| 2016/0216433 A1* | 7/2016 | Lee ..................... | G02B 6/0036 |
| 2017/0052312 A1* | 2/2017 | Jung ................... | G02B 6/0068 |
| 2017/0059961 A1* | 3/2017 | Park ................... | G02F 1/31 |
| 2017/0192152 A1* | 7/2017 | Choi ................... | G02B 6/0036 |

FOREIGN PATENT DOCUMENTS

| | | |
|---|---|---|
| CN | 104601974 A | 5/2015 |
| CN | 105044962 A | 11/2015 |
| CN | 205334016 U | 6/2016 |

* cited by examiner

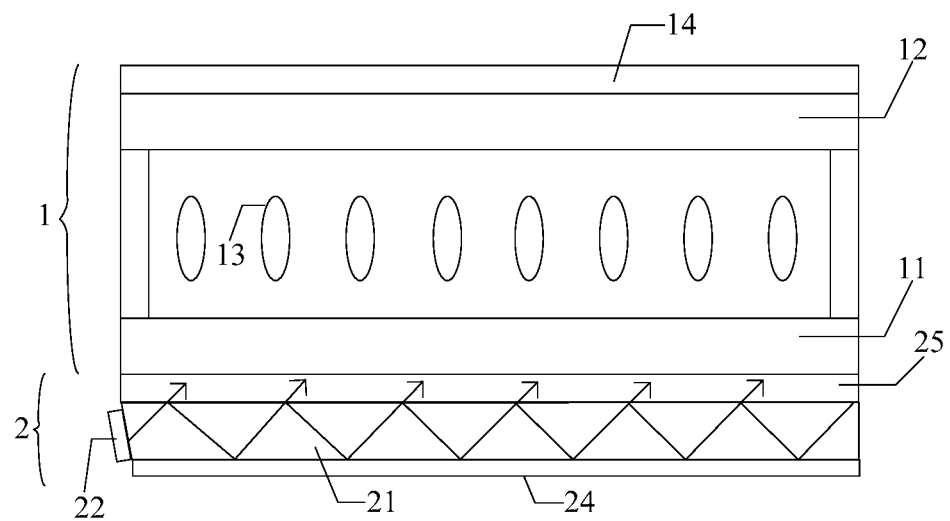
FIG. 5
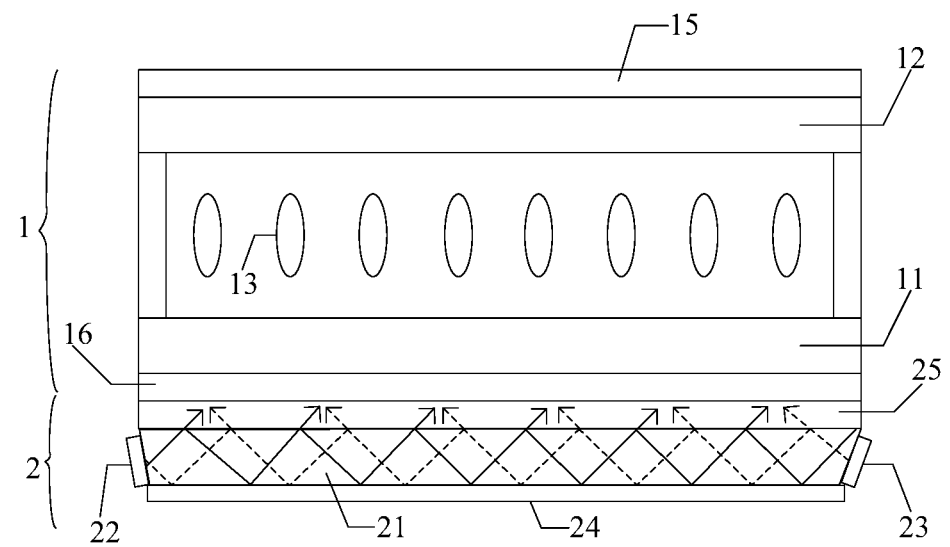
FIG. 6
| G2 | R1 | B2 | G1 | R2 | B1 | G2 |
FIG. 7

DISPLAY DEVICE HAVING DIFFRACTION GRATING STRUCTURE AND DRIVING METHOD FOR THE SAME

The application is a U.S. National Phase Entry of International Application No. PCT/CN2016/096729 filed on Aug. 25, 2016, designating the United States of America and claiming priority to Chinese Application No. 201610012370.6, filed on Jan. 8, 2016. The present application claims priority to and the benefit of the above-identified applications and the above-identified applications are incorporated by reference herein in their entirety.

TECHNICAL FIELD

Embodiments of the present disclosure relate to a display device and a driving method for the same.

BACKGROUND

At present, three-dimensional (3D) display technology has drawn plenty of attentions for generating stereoscopic and realistic images based on the principle that, the left eye and the right eye of a viewer respectively receive images with slight difference there-between, and the images can be integrated upon comprehensive analysis of the viewer so that the viewer can perceive depths of objects in the images and feel third dimensionality.

FIG. 1 illustrates a known 3D display device without glasses, including a liquid crystal display (LCD) panel 100 and a slit grating 110 disposed at a light emergent side of the LCD panel 100. The LCD panel 100 includes a plurality of first display units 101 and a plurality of second display units 102. The first display unit 101 displays a left-eye image L, and the second display unit 102 displays a right-eye image R. The slit grating 110 includes a light transmitting region 111 and a light blocking region 112. The slit grating 110 plays a role of separating an image so that the left eye of the viewer can only observe the left-eye image L, and the right eye of the viewer can only observe the right-eye image R, thereby achieving 3D effect.

The above-mentioned 3D display device requires the slit grating to assist in realizing 3D display, which would increase a thickness of the entire display device; moreover, a color filter (CF) layer in the LCD panel may result in light loss of at least 60% because it performs light filtering based on color resistance, which certainly would increase a power consumption of the 3D display device.

SUMMARY

Embodiments of the present disclosure provide a display device and a driving method for the same, which can reduce the thickness of the entire 3D display device and increase a transmittance thereof.

In order to achieve the above-mentioned objectives, embodiments of the present disclosure utilize technical solutions as below.

On one aspect, embodiments of the present disclosure provide a display device, including a LCD panel and a backlight module disposed at a light incident side of the LCD panel. A surface of the backlight module facing the LCD panel is provided with a diffraction grating structure, the diffraction grating structure is configured to allow light emitted by the backlight module to be incident onto the LCD panel and formed into alternately bright and dark stripe patterns which are arranged laterally and extending lengthways under 3D display mode, wherein every at least three bright stripe patterns arranged in sequence are considered as a group, and the bright stripe patterns in each group have colors different from each other.

In an example, the backlight module includes a light guide plate (LGP) and a first light source disposed at a first side of the LGP. The diffraction grating structure is disposed at a surface of the LGP facing the LCD panel. The first side of the LGP is an inclined surface and is configured to allow light emitted by the first light source to be reflected for several times within the LGP and emergent from the diffraction grating structure.

In an example, the LCD panel includes a plurality of gate lines, a plurality of data lines, and a plurality of sub-pixels arranged at matrix; wherein every adjacent two of the gate lines and every adjacent two of the data lines define one of the sub-pixels. Each of the bright stripe patterns is corresponding to one column of the sub-pixels, and each of the dark stripe patterns is corresponding to one column of the sub-pixels.

In an example, the backlight module further includes a second light source disposed at a second side of the LGP, and the second side is opposite to the first side. The second side of the LGP is an inclined surface and is configured to allow light emitted by the second light source to be reflected for several times within the LGP and emergent from the diffraction grating structure to be formed into a bright stripe pattern at each of the dark stripe patterns, which bright stripe pattern has a color different from that of two bright stripe patterns adjacent to the dark stripe pattern. An angle at which the first side is inclined is different from an angle at which the second side is inclined. The backlight module further includes a reflecting film disposed at a side of the LGP facing away from the LCD panel.

In an example, the backlight module further includes a scattering film disposed at a side of the LGP facing the LCD panel.

In an example, both the first light source and the second light source are polarized light source. The LCD panel further includes: an array substrate and an opposed substrate disposed opposite to each other, and a LC layer disposed between the array substrate and the opposed substrate. A side of the array substrate facing away from the opposed substrate is a light emergent side, and the LCD panel further includes a first polaroid disposed at the side of the array substrate facing away from the opposed substrate. Alternatively, a side of the opposed substrate facing away from the array substrate is a light emergent side, and the LCD panel further includes a first polaroid disposed at the side of the opposed substrate facing away from the array substrate.

In an example, both the first light source and the second light source are unpolarized light source. The LCD panel further includes: an array substrate and an opposed substrate disposed opposite to each other; a LC layer disposed between the array substrate and the opposed substrate; a second polaroid disposed at a side of the opposed substrate facing away from the array substrate; and a third polaroid disposed at a side of the array substrate facing away from the opposed substrate.

In an example, the diffraction grating structure is a sinusoidal phase grating structure.

On another aspect, embodiments of the present disclosure further provide a driving method for the display device, including: under 3D display mode, switching on a first light source to allow light emitted by the first light source to be incident onto a LCD panel through a diffraction grating structure and formed into alternately bright and dark stripe patterns which are arranged laterally and extending lengthways, wherein every at least three bright stripe patterns arranged in sequence are considered as a group, and the bright stripe patterns in each group have colors different from each other.

In an example, the driving method further includes: under 2D display mode, switching on both of a first light source and a second light source; allowing light emitted by the first light source to be incident onto the LCD panel through the diffraction grating structure and formed into alternately bright and dark stripe patterns which are arranged laterally and extending lengthways, wherein every at least three bright stripe patterns arranged in sequence are considered as a group, and the bright stripe patterns in each group have colors different from each other; and allowing light emitted by the second light source to be incident onto the LCD panel through the diffraction grating structure and formed into a bright stripe pattern at each of the dark stripe patterns, which bright stripe pattern has a color different from that of two bright stripe patterns adjacent to the dark stripe pattern.

According to the technical solutions of the present disclosure, the display device includes a LCD panel and a backlight module disposed at a light incident side of the LCD panel; a surface of the backlight module facing the LCD panel is provided with a diffraction grating structure. Under 3D display mode, the light emitted by the backlight module is incident onto the LCD panel through the diffraction grating structure and formed into alternately bright and dark stripe patterns which are arranged laterally and extending lengthways, wherein every at least three bright stripe patterns arranged in sequence are considered as a group, and the bright stripe patterns in each group have colors different from each other. In this way, by replacing the CF layer in the LCD panel and the slit grating at the light emergent side of the LCD panel with the diffraction grating structure at the surface of the backlight module, it can not only reduce the thickness of the entire display device but also prevent from light loss resulted by the CF layer made of color resistance materials, thereby improving the transmittance of the display device and reducing the power consumption, accordingly.

BRIEF DESCRIPTION OF THE DRAWINGS

Hereafter, the embodiments of the present invention will be described in a more detailed way with reference to the accompanying drawings, so as make one person skilled in the art be able to understand the present invention more clearly, wherein:

FIG. 4b is a cross-sectional view taken along AA direction of FIG. 4a;

FIG. 5 and FIG. 6 are a second structural diagram of a display device provided by an embodiment of the present disclosure, respectively; and FIG. 7 illustrates stripe patterns formed by light emitted from a first light source and a second light source in a display device provided by an embodiment of the present disclosure.

DETAILED DESCRIPTION

Hereafter, the technical solutions in the embodiments of the present disclosure will be described in a clearly and fully understandable way in connection with the drawings in the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the disclosure.

Unless otherwise defined, the technical terminology or scientific terminology used herein should have the same meaning as commonly understood by one of ordinary skill in the art to which this invention belongs. Likewise, terms like "first," "second," etc., which are used in the description and the claims of the present application for invention, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

Figure 1:
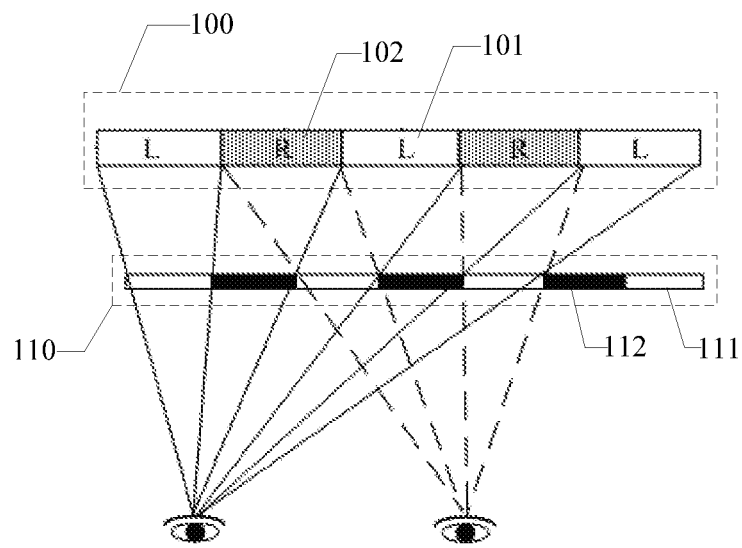
FIG. 1 is a structural diagram of a known three-dimensional (3D) display device.
Figure 2:
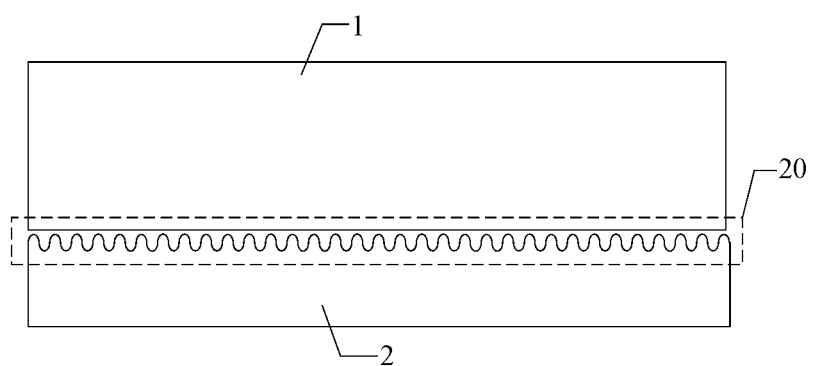
FIG. 2 is a first structural diagram of a display device provided by an embodiment of the present disclosure.

FIG. 2 illustrates a display device provided by an embodiment of the present disclosure, including a liquid crystal display (LCD) panel 1 and a backlight module 2 disposed at a light incident side of the LCD panel 1; a surface of the backlight module 2 facing the LCD panel 1 is provided with a diffraction grating structure 20, the diffraction grating structure 20 is configured to allow light emitted by the backlight module 2 to be incident onto the LCD panel 1 and formed into alternately bright and dark stripe patterns which are arranged laterally and extending lengthways under 3D display mode, wherein every at least three bright stripe patterns arranged in sequence are considered as a group, and the bright stripe patterns in each group have colors different from each other.

Figure 3:
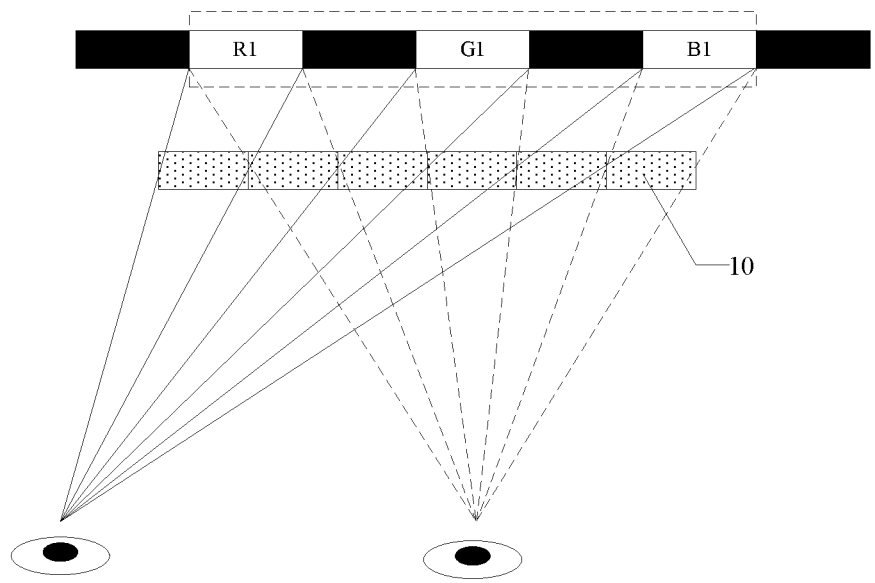
FIG. 3 is a schematic diagram illustrating a display device provided by an embodiment of the present disclosure in 3D display mode or 2D display mode.

In an example illustrated in FIG. 3, every three bright stripe patterns arranged in sequence are regarded as a group (indicated by a dashed box in FIG. 3), and colors of the three bright stripe patterns in each group are red (R1), green (G1) and blue (B1), respectively. The light emergent from the diffraction grating is formed into alternately bright and dark stripe patterns and incident onto sub-pixels 10 of the LCD panel, so that a left eye of a viewer can only observe a left-eye image while a right eye of the viewer can only observe a right-eye image, thereby achieving a three-dimensional (3D) display effect because the left-eye image will be slightly different from the right-eye image. Certainly, it's also possible to consider every four bright stripe patterns arranged in sequence as a group, and the four bright stripe patterns in each group have colors different from each other, for example, red, green, blue and yellow, although the embodiments of the present disclosure are not limited thereto.

In the above-mentioned display device provided by the embodiment of the present disclosure, the light emitted by the backlight module is incident onto the LCD panel through the infraction grating and formed into alternately bright and dark stripe patterns which are arranged laterally and extending lengthways. The bright stripe patterns are equivalent to colored backlight, while the dark stripe patterns are equivalent to a slit grating, so that the infraction grating structure on the surface of the backlight module is utilized to replace a color filter (CF) layer in the LCD panel and the slit grating on a light emergent side of the LCD panel, which cannot only reduce the thickness of the entire display device but also prevent from light loss resulted by the CF layer made of color resistance materials, thereby improving the transmittance of the display device and reducing the power consumption accordingly.

In an example of the above-mentioned display device provided by the embodiment of the present disclosure, the infraction grating structure can be a sinusoidal phase grating structure which modulates an angle at which the light is emergent there-from and causes a chromatic dispersion of the light. Certainly, the infraction grating structure disposed on the surface of the backlight module in the above-mentioned display device provided by the embodiment of the present disclosure can be any other well-known structures capable of forming alternately bright and dark, colored, stripe patterns, without particularly defined herein. In an example, the infraction grating structure can be formed on the surface of the backlight module by using photolithography technique.

Figure 4A:
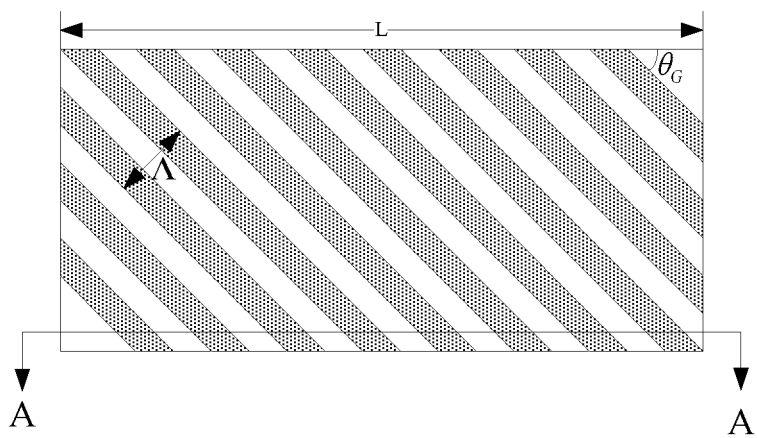
FIG. 4a is a structural diagram of a diffraction grating structure in a display device provided by an embodiment of the present disclosure.
Figure 4B:
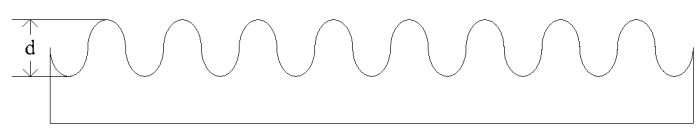

Hereinafter specific structure and principle of the sinusoidal phase grating structure will be described in details. As illustrated in FIG. 4a and FIG. 4b which is a cross-sectional view taken along A-A direction of FIG. 4A, assuming that the sinusoidal phase grating structure has an inclined angle $\theta_G$, a grating constant $\Lambda$, a grating length L, a grating thickness d in sinusoidal variation and a fixed, grating refractive index $\Delta n$ (alternatively, a fixed, grating thickness d, and a grating refractive index $\Delta n$ in sinusoidal variation), then a complex amplitude transmission coefficient is expressed as:

$$t(r_q) = \left[\sum_{q=-\infty}^{\infty} J_q(v)\exp(i2\pi q u r_q)\right] \cdot rect\left(\frac{r_q}{L}\right),$$

where $J_q$ represents a q-order first-class Bessel function, $u=1/\Lambda$ represents a space frequency of the grating structure, $r_q=(\alpha_q, \beta_q, \gamma_q)$ describes a direction cosine of emergent light, and an intensity of the emergent light is modulated by $v=2\pi\Delta nd/\lambda$, where $\lambda$ is a wavelength of the emergent light. As it can be seen, the sinusoidal phase grating structure is capable of modulating a phase of incident light. For example, the incident light with a direction cosine $(\alpha, \beta, \gamma)$ will become emergent light with a direction cosine $(\alpha_q, \beta_q, \gamma_q)$ upon passing through the sinusoidal phase grating structure, wherein a transform relation between the direction cosines of the emergent light and the incident light is expressed by:

$$\begin{cases} \alpha_q = \alpha + q\frac{\lambda}{\Lambda}\cos\theta_G \\ \beta_q = \beta + q\frac{\lambda}{\Lambda}\sin\theta_G \\ \gamma_q = (1 - \alpha_q^2 - \beta_q^2)^{1/2} \end{cases}.$$

Thus as it can be seen, an angle at which the light is emergent is merely correlated with the inclined angle $\theta_G$ of the grating, the grating constant $\Lambda$ and the wavelength $\lambda$ of the emergent light. By considerably configuring respective parameters of the sinusoidal phase grating structure, the light passing through the sinusoidal phase grating structure can be formed into diffraction fringes as illustrated in FIG. 3; in this way, the CF layer in the LCD panel and the slit grating on the light emergent side of the LCD panel can be replaced by the diffraction grating structure disposed on the surface of the backlight module, which does not only reduce the thickness of the entire display device but also prevent from light loss resulted by the CF layer made of color resistance material, thereby improving the transmittance of the display device and reducing the power consumption accordingly.

In an example of the above-mentioned display device provided by the embodiment of the present disclosure, as illustrated in FIG. 5, the backlight module 2 can include a light guide plate (LGP) 21 and a first light source 22 disposed at a first side of the LGP 21; the diffraction grating structure (not illustrated in FIG. 5) is located on a surface of the LGP 21 facing the LC panel 1; the first side of the LGP 21 is an inclined surface configured to cause the light emitted by the first light source 22 to be reflected for several times within the LGP 21 and emerged from the diffraction grating structure (as indicated by the slide line illustrated in FIG. 5). For example, the light emitted by the first light source 22, when reflected to a side of the LGP 21 provided with the diffraction grating structure, will be emerged from the diffraction grating structure; and the light emitted by the first light source 22, when reflected to the other side of the LGP 21, will be reflected back to the side of the LGP 21 provided with the diffraction grating structure and emerged from the diffraction grating structure. The first light source 22 emits white light, and the light emerged from the diffraction grating structure is formed into alternately bright and dark stripe patterns which are arranged laterally and extending lengthways. Considering, for example, every three bright stripe patterns arranged in sequence as a group, the bright stripe patterns in each group have colors of red (R), green (G) and blue (B), respectively.

In an example of the above-mentioned display device provided by the embodiment of the present disclosure, the LCD panel can include a plurality of gate lines, a plurality of data lines, and a plurality of sub-pixels arranged at matrix. Every two adjacent gate lines and every two adjacent data lines together define one of the sub-pixels. For example, each of the bright stripe patterns is corresponding to one column of sub-pixels, and each of the dark stripe patterns is corresponding to one column of sub-pixels. For another example, each of the bright stripe patterns is corresponding to multiple columns of sub-pixels, and each of the dark stripe patterns is corresponding to multiple columns of sub-pixels, although the embodiments of the present disclosure are not limited thereto. Parameters of the diffraction grating structure, and the number of the columns of the sub-pixels to which each of the bright and dark stripe patterns corresponds, can be configured and adjusted according to actual demands.

In an illustrative operation of the above-mentioned display device provided by the embodiment of the present disclosure, the light emitted by the first light source of the backlight module is formed into alternately bright and dark stripe patterns upon emerging from the diffraction grating structure and is incident onto the LCD panel so that the viewer can only observe a left-eye image by his left eye and observe a right-eye image by his right eye. Under 3D display mode, the left-eye image is slightly different from the right-eye image, which allows the viewer to perceive depths of objects in the images to feel third dimensionality, thereby achieving 3D display effect. Under 2D display mode, the left-eye image is identical with the right-eye image, thereby achieving 2D display effect.

It should be noted that, under 2D display mode of the above-mentioned display device provided by the embodiment of the present disclosure, the left eye and the right eye of the viewer respectively receive an image which is formed by one half of the sub-pixels of the LCD panel and correspondingly losses one half of the resolution ratio. Due to the above, in an example of the display device provided by the embodiment of the present disclosure, as illustrated in FIG. 6, the backlight module 2 can further include a second light source 23 disposed at a second side of the LGP 21; the second side is opposite to the first side; the second side of the LGP 21 is an inclined surface, and light emitted by the second light source 23 will be reflected for several times within the LGP 21 and emergent (as indicated by the dotted line in FIG. 6) from the diffraction grating structure (not illustrated in FIG. 6). For example, the light emitted by the second light source 23, when reflected onto a side of the LGP 21 provided with the diffraction grating structure, will be emergent from the diffraction grating structure; and the light emitted by the second light source 23, when reflected onto the other side of the LGP 21, will be reflected back to the side of the LGP 21 provided with the diffraction grating structure and emergent from the diffraction grating structure. Under 2D display mode, both the first light source 22 and the second light source 23 are switched on, so that the light emitted by the first light source 22, upon emerging from the diffraction grating structure, will be formed into alternately bright and dark stripe patterns (dark, R1, dark, G1, dark, B1, dark) as illustrated in FIG. 3, and the light emitted by the second light source 23, upon emerging from the diffraction grating structure, will be formed into a bright stripe pattern at each of the dark stripe patterns illustrated in FIG. 3, which bright stripe pattern has a color different from both of two bright stripe patterns adjacent to the dark stripe pattern, so as to achieve the stripe patterns (G2, R1, B2, G1, R2, B1, G2) illustrated in FIG. 7. In the stripe patterns as illustrated in FIG. 7, each of the bright stripe patterns is corresponding to one column of sub-pixels of the LCD panel, and all the stripe patterns as illustrated in FIG. 7, as a whole, are equivalent to colored backlight. Under 2D display mode of the display device provided by the embodiment of the present disclosure, the left eye and the right eye of the viewer respectively receive an image which is formed by all the sub-pixels of the LCD panel and correspondingly double the resolution ratio of the display device under 2D display mode.

In an example of the above-mentioned display device provided by the embodiment of the present disclosure, as illustrated in FIG. 6, the angle at which the first side is inclined can be arranged to be different from the angle at which the second side is inclined. In this way, the stripe pattern formed by the light emitted by the first light source 22 and emergent from the diffraction grating structure can be located differently from the stripe pattern formed by the light emitted by the second light source 23 and emergent from the diffraction grating structure, so as to obtain the stripe patterns as illustrated in FIG. 7.

In an example of the above-mentioned display device provided by the embodiment of the present disclosure, as illustrated in FIG. 5 and FIG. 6, the backlight module 2 can further include a reflecting film 24 disposed at a side of the LGP 21 facing away from the LCD panel 1, so that the light emitted by the first light source 22, when irradiated onto the side of the LGP 21 not provided with the diffraction grating structure, will be all reflected back to the side of the LGP 21 provided with the diffraction grating structure and then emergent from the diffraction grating structure, thereby improving the light utilization of the first light source 22. Similarly, the light emitted by the first light source 23, when irradiated onto the side of the LGP 21 not provided with the diffraction grating structure, will be all reflected back to the side of the LGP 21 provided with the diffraction grating structure and then emergent from the diffraction grating structure, thereby improving the light utilization of the second light source 23.

It should be noted that, in the above-mentioned display device provided by the embodiment of the present disclosure, the light will be emergent from the diffraction grating structure at a same angle because the light emitted by the first light source has been reflected for several times within the LGP. In other words, the light emitted by the first light source, upon emerging from the diffraction grating structure, will be propagating along a certain direction only, which results in a relatively narrow view angle of the display device. Due to the above, for achieving wide-angle display, in an example of the display device provided by the embodiment of the present disclosure, as illustrated in FIG. 5 and FIG. 6, the backlight module 2 can further include a scattering film 25 through which the light emergent from the diffraction grating structure will be uniformly propagating along various directions.

In an example of the above-mentioned display device provided by the embodiment of the present disclosure, both the first light source and the second light source can be polarized light source; alternatively, both the first light source and the second light source can be unpolarized light source, without particularly defined herein.

In the case where both the first light source and the second light source are polarized light source, as illustrated in FIG. 5, the LCD panel can further include: an array substrate 11 and an opposed substrate 12 disposed opposite to each other, and a LC layer 13 disposed between the array substrate 11 and the opposed substrate 12. As illustrated in FIG. 5, a side of the opposed substrate 12 facing away from the array substrate 11 can be configured as a light emergent side, that is, the backlight module 2 is disposed at the side of the array substrate 11 facing away from the opposed substrate 12. Alternatively, a side of the array substrate 11 facing away from the opposed substrate 12 can be configured as a light emergent side, that is, the backlight module 2 is disposed at the side of the opposed substrate 12 facing away from the array substrate 11. Embodiments of the present disclosure are not particularly defined herein. For example, as illustrated in FIG. 5, when the side of the opposed substrate 12 facing away from the array substrate 11 is configured as the light emergent side, the LCD panel can further include a first polaroid 14 disposed at the side of the opposed substrate 12 facing away from the array substrate 11; in this way, there is no need of disposing a polaroid at the side of the array substrate 11 facing away from the opposed substrate 12, which can not only decrease the thickness of the entire display device but also further improve the light utilization of the backlight module 2. For another example, when the side of the array substrate 11 facing away from the opposed substrate 12 is configured as the light emergent side, the LCD panel can further include a first polaroid 14 disposed at the side of the array substrate 11 facing away from the opposed substrate 12; in this way, there is no need of disposing a polaroid at the side of the opposed substrate 12 facing away from the array substrate 11, which can not only decrease the thickness of the entire display device but also further improve the light utilization of the backlight module 2.

In another example where both the first light source and the second light source in the display device are unpolarized light source, as illustrated in FIG. 6, the LCD panel can further include: an array substrate 11 and an opposed substrate 12 disposed opposite to each other; a LC layer 13 disposed between the array substrate 11 and the opposed substrate 12; a second polaroid 15 disposed at a side of the opposed substrate 12 facing away from the array substrate 11; and a third polaroid 16 disposed at a side of the array substrate 11 facing away from the opposed substrate 12. It should be noted that, as illustrated in FIG. 6, the side of the opposed substrate 12 facing away from the array substrate 11 can be configured as the light emergent side, that is, the backlight module 2 is disposed at the side of the array substrate 11 facing away from the opposed substrate 12; alternatively, the side of the array substrate 11 facing away from the opposed substrate 12 can be configured as the light emergent side, that is, the backlight module 2 is disposed at the side of the opposed substrate 12 facing away from the array substrate 11, without particularly defined herein.

For the above display device, the embodiment of the present disclosure further provides a driving method, including: under 3D display mode, switching on a first light source to allow light emitted by the first light source to be incident onto a LCD panel through a diffraction grating so as to be formed into alternately bright and dark stripe patterns which are arranged laterally and extending lengthways; wherein every at least three bright stripe patterns arranged in sequence are considered as a group, and the bright stripe patterns in each group have colors different from each other.

In the driving method for display device provided by the embodiment of the present disclosure, the light emitted by the first light source is formed into alternately bright and dark stripe patterns and irradiated onto the LCD panel, so that the viewer can only observe a left-eye image by his left eye and a right-eye image by his right eye. Under 3D display mode, the left-eye image is slightly different from the right-eye image so that the viewer can perceive depths of objects in the images to feel third dimensionality, thereby achieving 3D display effect. Under 2D display mode, the left-eye image is identical with the right-eye image so as to achieve 2D display effect.

It should be noted that, under 2D display mode of the driving method provided by the embodiment of the present disclosure, the left eye and the right eye of the viewer respectively receive an image which is formed by one half of the sub-pixels of the LCD panel and correspondingly losses one half of the resolution ratio. Due to the above, an example of the driving method provided by the embodiment of the present disclosure can further include: under 2D display mode, switching on both a first light source and a second light source so that light emitted by the first light source is incident onto the LCD panel through a diffraction grating structure and formed into alternately bright and dark stripe patterns which are arranged laterally and extending lengthways, wherein every at least three bright stripe patterns arranged in sequence are considered as a group, and the bright stripe patterns in each group have colors different from each other; and that the light emitted by the second light source is incident onto the LCD panel through the diffraction grating structure and formed into a bright stripe pattern at each of the dark stripe patterns, which bright stripe pattern has a color different from two bright stripe patterns adjacent to the dark stripe pattern. In this way, under 2D display mode, the left eye and the right eye of the viewer respectively receive an image which is formed by all the sub-pixels of the LCD panel and correspondingly double the resolution ratio under 2D display mode.

The implementation of the above driving method provided by the embodiment of the present disclosure is similar to that of the foregoing display device, of which the repeated contents will be omitted herein.

It should be explained that the above-mentioned display device provided by the embodiments of the present disclosure can be any product or component having display function such as mobile phone, tablet computer, TV set, displayer, notebook computer, digital photo frame and navigator, without particularly defined herein.

As above, the embodiments of the present disclosure provide a display device and a driving method for the same. The display device includes a LCD panel and a backlight module disposed at a light incident side of the LCD panel. A side of the backlight module facing the LCD panel is provided with a diffraction grating structure, so that under 3D display mode, light emitted by the backlight module is incident onto the LCD panel through the diffraction grating structure and formed into alternately bright and dark stripe patterns which are arranged laterally and extending lengthways, wherein every at least three bright stripe patterns arranged in sequence are considered as a group, and the bright stripe patterns in each group have colors different from each other. In this way, by replacing the CF layer in the LCD panel and the slit grating at the light emergent side of the LCD panel with the diffraction grating structure at the surface of the backlight module, it cannot only reduce the thickness of the entire display device but also prevent from light loss resulted by the CF layer made of color resistance materials, thereby improving the transmittance of the display device and reducing the power consumption accordingly.

The foregoing embodiments merely are exemplary embodiments of the disclosure and not intended to define the scope of the disclosure, and any variations or replacements which can be easily thought of by those skilled in the art in the technical scope of the disclosure shall fall within the scope of disclosure. Therefore, the scope of the disclosure shall be determined by the scope of the appended claims.

The present disclosure claims the benefits of Chinese patent application No. 201610012370.6, which was filed with the SIPO on Jan. 8, 2016 under the title of "A DISPLAY DEVICE AND A DRIVING METHOD FOR THE SAME" and is fully incorporated herein by reference as part of this application.

The invention claimed is:

1. A display device, comprising a liquid crystal display (LCD) panel and a backlight module disposed at a light incident side of the LCD panel, wherein the backlight module comprises:
   a light guide plate (LGP) and a first light source disposed at a first side of the LGP;
   a surface of the LGP facing the LCD panel is provided with a diffraction grating structure, the diffraction grating structure is configured, under both 2D display mode and 3D display mode, to allow light emitted by the first light source to be incident onto the LCD panel through the diffraction grating structure and formed into alternately bright and dark stripe patterns which are arranged laterally and extending lengthways,
   wherein every at least three bright stripe patterns are considered as a group, and the bright stripe patterns in each group have colors different from each other, wherein the backlight module further comprises a second light source disposed at a second side of the LGP, the second side is opposite to the first side; and the diffraction grating structure is further configured, under only the 2D display mode, to allow light emitted by the second light source to be formed into a bright stripe pattern at each of the dark stripe patterns formed by the first light source, which bright stripe pattern has a color different from that of two bright stripe patterns adjacent to the dark stripe pattern formed by the first light source, wherein the diffraction grating structure is a sinusoidal phase grating structure which modulates an emergent angle of light and causes a chromatic dispersion of the light so that the alternately bright and dark stripe patterns are colored stripe patterns, wherein the emergent angle of light emitted by the first light source is different from the emergent angle of light emitted by the second light source.

2. The display device according to claim 1, wherein the first side of the LGP is an inclined surface, and is configured to allow light emitted by the first light source to be reflected for several times within the LGP and emergent from the diffraction grating structure.

3. The display device according to claim 2, wherein the backlight module further comprises a reflecting film disposed at a side of the LGP facing away from the LCD panel.

4. The display device according to claim 2, wherein the backlight module further comprises a scattering film disposed at a side of the LGP facing the LCD panel.

5. The display device according to claim 2, wherein the LCD panel comprises a plurality of gate lines, a plurality of data lines, and a plurality of sub-pixels arranged at matrix; wherein every adjacent two of the gate lines and every adjacent two of the data lines define one of the sub-pixels;

each of the bright stripe patterns is corresponding to one column of the sub-pixels, and each of the dark stripe patterns is corresponding to one column of the sub-pixels.

6. The display device according to claim 5, wherein the second side of the LGP is an inclined surface, and is configured to allow light emitted by the second light source to be reflected for several times within the LGP and emergent from the diffraction grating structure.

7. The display device according to claim 6, wherein both the first light source and the second light source are polarized light source, and the LCD panel further comprises: an array substrate and an opposed substrate disposed opposite to each other, and a LC layer disposed between the array substrate and the opposed substrate, wherein a side of the array substrate facing away from the opposed substrate is a light emergent side, and the LCD panel further comprises a first polaroid disposed at the side of the array substrate facing away from the opposed substrate; or, a side of the opposed substrate facing away from the array substrate is a light emergent side, and the LCD panel further comprises a first polaroid disposed at the side of the opposed substrate facing away from the array substrate.

8. The display device according to claim 6, wherein both the first light source and the second light source are unpolarized light source, and the LCD panel further comprises: an array substrate and an opposed substrate disposed opposite to each other; a LC layer disposed between the array substrate and the opposed substrate; a second polaroid disposed at a side of the opposed substrate facing away from the array substrate; and a third polaroid disposed at a side of the array substrate facing away from the opposed substrate.

9. The display device according to claim 6, wherein the backlight module further comprises a reflecting film disposed at a side of the LGP facing away from the LCD panel.

10. The display device according to claim 6, wherein the backlight module further comprises a scattering film disposed at a side of the LGP facing the LCD panel.

11. The display device according to claim 6, wherein an angle at which the first side is inclined is different from an angle at which the second side is inclined.

12. The display device according to claim 11, wherein both the first light source and the second light source are polarized light source, and the LCD panel further comprises: an array substrate and an opposed substrate disposed opposite to each other, and a LC layer disposed between the array substrate and the opposed substrate, wherein a side of the array substrate facing away from the opposed substrate is a light emergent side, and the LCD panel further comprises a first polaroid disposed at the side of the array substrate facing away from the opposed substrate; or, a side of the opposed substrate facing away from the array substrate is a light emergent side, and the LCD panel further comprises a first polaroid disposed at the side of the opposed substrate facing away from the array substrate.

13. The display device according to claim 11, wherein both the first light source and the second light source are unpolarized light source, and the LCD panel further comprises: an array substrate and an opposed substrate disposed opposite to each other; a LC layer disposed between the array substrate and the opposed substrate; a second polaroid disposed at a side of the opposed substrate facing away from the array substrate; and a third polaroid disposed at a side of the array substrate facing away from the opposed substrate.

14. A driving method for the display device according to claim 1, wherein the diffraction grating structure is disposed at a surface of the LGP facing the LCD panel;

wherein the first side of the LGP is an inclined surface, and is configured to allow light emitted by the first light source to be reflected for several times within the LGP and emergent from the diffraction grating structure;

wherein the driving method comprises:

under 3D display mode, switching on only the first light source to allow light emitted by the first light source to be incident onto the LCD panel through the diffraction grating structure and formed into alternately bright and dark stripe patterns which are arranged laterally and extending lengthways, wherein every at least three bright stripe patterns are considered as a group, and the bright stripe patterns in each group have colors different from each other;

wherein the second side of the LGP is an inclined surface, and is configured to allow light emitted by the second light source to be reflected for several times within the LGP and emergent from the diffraction grating structure to be formed into a bright stripe pattern at each of the dark stripe patterns, which bright stripe pattern has a color different from that of two bright stripe patterns adjacent to the dark stripe pattern;

wherein the driving method further comprises:

under 2D display mode, switching on both the first light source and the second light source;

allowing light emitted by the first light source to be incident onto the LCD panel through the diffraction grating structure and formed into alternately bright and dark stripe patterns which are arranged laterally and extending lengthways, wherein every at least three bright stripe patterns are considered as a group, and the bright stripe patterns in each group have colors different from each other; and allowing light emitted by the second light source to be incident onto the LCD panel through the diffraction grating structure and formed into a bright stripe pattern at each of the dark stripe patterns, which bright stripe pattern has a color different from that of two bright stripe patterns adjacent to the dark stripe pattern.

* * * * *